United States Patent
Lloyd et al.

(10) Patent No.: US 11,995,490 B2
(45) Date of Patent: May 28, 2024

(54) CIRCUITRY FOR USE IN SMART CARDS AND OTHER APPLICATIONS

(71) Applicant: FREEVOLT TECHNOLOGIES LIMITED, London (GB)

(72) Inventors: Alison Lloyd, London (GB); Vitor Freitas, London (GB)

(73) Assignee: FREEVOLT TECHNOLOGIES LIMITED, London (GB)

( * ) Notice: Subject to any disclaimer, the term of this patent is extended or adjusted under 35 U.S.C. 154(b) by 46 days.

(21) Appl. No.: 17/261,369

(22) PCT Filed: Jul. 22, 2019

(86) PCT No.: PCT/GB2019/052047
§ 371 (c)(1),
(2) Date: Jan. 19, 2021

(87) PCT Pub. No.: WO2020/016615
PCT Pub. Date: Jan. 23, 2020

(65) Prior Publication Data
US 2021/0279540 A1 Sep. 9, 2021

(30) Foreign Application Priority Data
Jul. 20, 2018 (GB) ..................... 1811880

(51) Int. Cl.
*G06K 19/07* (2006.01)
*G06K 7/00* (2006.01)
(Continued)

(52) U.S. Cl.
CPC ....... *G06K 19/0723* (2013.01); *G06K 7/0008* (2013.01); *H02J 50/12* (2016.02);
(Continued)

(58) Field of Classification Search
CPC .. G05F 1/613; G06K 7/0008; G06K 19/0701; G06K 19/0708; G06K 19/0709;
(Continued)

(56) References Cited

U.S. PATENT DOCUMENTS 4,783,646 A * 11/1988 Matsuzaki ......... G08B 13/2437
340/572.5
5,084,699 A 1/1992 Demichele
(Continued)

FOREIGN PATENT DOCUMENTS

GB 2531378 4/2016
GB 2541036 2/2017
(Continued)

OTHER PUBLICATIONS

Search and Examination Report issued in UK App. No. GB1811880.2 (dated 2019).
(Continued)

*Primary Examiner* — Stephen R Burgdorf
(74) *Attorney, Agent, or Firm* — Barnes & Thornburg LLP (57) ABSTRACT

A smart card comprising rectification circuitry arranged to receive an alternating electrical signal from a near field RF communications antenna of the smart card, and convert it into DC electrical energy for powering an auxiliary circuit. The rectification circuitry comprises a first inductor arranged so that the alternating electrical signal flows through the first inductor and a second inductor arranged for inductive coupling with the first inductor to provide the alternating electrical signal to a near field RF communicator.

20 Claims, 5 Drawing Sheets

(51) Int. Cl.
  *H02J 50/12* (2016.01)
  *H04B 5/26* (2024.01)
  *H04B 5/72* (2024.01)
  *H04B 5/77* (2024.01)

(52) U.S. Cl.
  CPC .............. *H04B 5/26* (2024.01); *H04B 5/72* (2024.01); *H04B 5/77* (2024.01)

(58) Field of Classification Search
  CPC ........... G06K 19/0716; G06K 19/0718; G06K 19/0723; G06K 19/07749; G06K 19/07756; H01Q 1/2225; H01Q 1/248; H02H 7/22; H02J 50/12; H02J 50/20; H04B 1/1607; H04B 5/0031; H04B 5/0037; H04B 5/0062; H04B 5/0081; H04B 5/02
  USPC ...................................................... 340/10.34
  See application file for complete search history.

(56) References Cited

U.S. PATENT DOCUMENTS

| | | | |
|---|---|---|---|
| 6,774,865 | B1 | 8/2004 | Serra |
| 9,489,813 | B1 | 11/2016 | Beigel |
| 10,157,848 | B2* | 12/2018 | Pueschner ........ G06K 19/07747 |
| 2004/0213169 | A1 | 10/2004 | Allard et al. |
| 2005/0134460 | A1 | 6/2005 | Usami |
| 2005/0240778 | A1* | 10/2005 | Saito ................ G06K 19/07354 713/186 |
| 2008/0308641 | A1* | 12/2008 | Finn .................... G06K 19/0723 235/492 |
| 2009/0027208 | A1 | 1/2009 | Martin et al. |
| 2010/0039234 | A1* | 2/2010 | Soliven ..................... H04B 5/02 340/10.1 |
| 2010/0190435 | A1* | 7/2010 | Cook ........................ H01Q 7/00 455/41.1 |
| 2011/0205058 | A1 | 8/2011 | Phipps et al. |
| 2014/0131453 | A1 | 5/2014 | Lahoui et al. |
| 2014/0224886 | A1 | 8/2014 | Nihei et al. |
| 2015/0269477 | A1* | 9/2015 | Finn ................. G06K 19/07747 235/492 |
| 2017/0237466 | A1* | 8/2017 | Carr .................... H04B 5/0031 455/41.1 |
| 2021/0210442 | A1* | 7/2021 | Dalmia .................. H01L 24/16 |

FOREIGN PATENT DOCUMENTS

| | | |
|---|---|---|
| JP | 2001-101371 | 4/2001 |
| WO | 02/099764 | 12/2002 |
| WO | 2017/205176 | 11/2017 |

OTHER PUBLICATIONS

Search Report & Written Opinion issued in Int'l App. No. PCT/GB2019/052047 (dated 2019).
Examination Report issued in EP19745736.9 (dated Jun. 29, 2023).

\* cited by examiner

| d(mm) | K* |
|---|---|
| 0.5 | 0.286 |
| 5 | 0.326 |
| 10 (perfect overlap) | 0.77 |

*K obtained by short/open method

Figure 8

| d(mm) | K* |
|---|---|
| 0 (perfect alignment) | 0.91 |
| 5 | 0.23 |
| 10 (coil side by side) | 0.08 |

*K obtained by short/open method

CIRCUITRY FOR USE IN SMART CARDS AND OTHER APPLICATIONS

This application is a U.S. National Stage Application Under 35 U.S.C. § 371 of PCT Application No. PCT/GB2019/052047 filed on Jul. 22, 2019, which claimed priority from United Kingdom Application No. GB 1811880.2 filed Jul. 20, 2018, the entirety of each are hereby fully incorporated by reference herein.

FIELD OF INVENTION

The present invention relates to methods and apparatus, and more particularly to methods and apparatus for cards with integrated data processing or communications capabilities, commonly known as smart cards.

BACKGROUND

Smart cards, also known as chip cards, or integrated circuit cards (ICC), are increasingly prevalent. A wide variety of such pocket-sized cards with embedded integrated circuits are in use in a wide variety of applications. The most frequent uses of such cards relate to financial transactions, mass transit systems, and access control. Smart cards are made of plastic, generally polyvinyl chloride, but sometimes polyethylene-terephthalate-based polyesters, acrylonitrile butadiene styrene or polycarbonate. Reusable smart cards may also be made from paper. Such cards often incorporate an integrated circuit, IC, and some source of power such as a near field RF communications interface for powering the IC and providing data communications to and from it.

An IC device, herein called a chip, traditionally consists of a single semiconductor die which has a particular function and which is adapted to interact with other chips and components. For example, a traditional chip might be a microprocessor, a memory controller, or a memory array. IC systems may include two or more chips, as well as other electronic and electrical components, each attached to and interconnected through a mounting system such as a printed circuit board.

Near field RF (radio frequency) communication requires an antenna of one near field RF communicator to be present within the alternating magnetic field (H field) generated by the antenna of another near field RF communicator by transmission of an RF signal (for example a 13.56 Mega-Hertz signal) to enable the magnetic field (H field) of the RF signal to be inductively coupled between the communicators. The RF signal may be modulated to enable communication of control and/or other data. Ranges of up to several centimetres (generally a maximum of 1 metre) are common for near field RF communicators.

Near field communication in the context of this application may be referred to as near-field RF communication, near field RFID (Radio Frequency Identification) or near field communication. The range of such devices depends on the antenna used but may be, for example, up to 1 metre. The precise range may depend on transmit power, and modulation scheme.

Communication of data between NFC communicators may be via an active communication mode in which the NFC communicator transmits or generates an alternating magnetic field modulated with the data to be communicated and the receiving NFC communicator responds by transmitting or generating its own modulated magnetic field, or via a passive communication mode in which one NFC communicator transmits or generates an alternating magnetic field and maintains that field and the responding NFC communicator modulates the magnetic field to which it is inductively coupled with the data to be communicated, for example by modulating the load on the inductive coupling ("load modulation"). Near field RF communicators may be actively powered, that is have an internal or associated power source, or passively powered, that is derive a power supply from a received magnetic field. Generally an RF transceiver will be actively powered while an RF transponder may be passively or actively powered.

Examples of near field RF communicators are defined in various standards for example ISO/IEC 18092 and ISO/IEC 21481 for NFC communicators, and ISO/IEC 14443 and ISO/IEC 15693 for near field RF communicators.

The ability of near field RF communications devices to be passively powered is a significant benefit. Some near field communicator chips also provide auxiliary power outputs. This can enable power harvested by the near field RF communicator to be used by other circuits.

UK patent application GB2531378 describes an RFID system in which when an RFID reader sends a command to an RFID device, the device does not respond, but rather waits and harvests the power to drive some auxiliary functionality e.g. functionality not required for responding to the command, for example the command may be a "request to provide identification code" command. In this prior art system, a response to the command from the RFID device is intentionally delayed so as to allow the auxiliary function to be performed first. In this system, the auxiliary function is biometric authentication, and the RFID device does not respond to the command until the biometric authentication has been completed.

This may extend the interaction time of the RFID device (e.g. the period of time for which an RFID device must be held in proximity to a reader). The perceived delay in operation associated with this may be unacceptable to users. Such delay may also contravene PCI requirements regarding the duration of a transaction.

Miniaturisation of circuitry for smart cards often leads to the use of so called system-on-chip, or SoC, architecture in which a variety of functionality is integrated into a single semiconductor chip. This can significantly simplify the manufacture of smart cards, because little more than antennas or electrical connections need be provided on the smart card itself.

SUMMARY

Aspects and examples of the present invention are set out in the appended claims and may aim to increase energy efficiency of miniaturised power splitters, and other components, integrated into smart cards for dividing electrical power between communications functionality and other functionality carried by the smart card. Some aspects are directed to apparatus incorporating auxiliary power harvesting (such as auxiliary rectifiers) into near field radio frequency (RF) communications enabled apparatus such as smart cards.

An aspect of the disclosure provides a smart card comprising a near field RF communicator and rectification circuitry arranged to receive an alternating electrical signal and convert it into DC electrical energy for powering an auxiliary circuit, wherein the rectification circuitry comprises a first inductor arranged so that the alternating electrical signal flows through the first inductor in the process of said converting. The smart card also comprises a second inductor arranged for inductive coupling with the first inductor to provide the alternating electrical signal to the near field RF communicator. This can enable part of the power in the RF electrical signal to be provided to the near field RF communicator via the two inductors, and part of the power to be provided, in the form of DC electrical energy, to the output of the rectifier. Significantly the first inductor performs a dual function in that it plays a role in the rectifier, for example in rectifier matching, and also in the power splitter to divide the received electrical energy between the near field RF communicator and an auxiliary circuit.

The first inductor may be arranged to provide impedance matching between the rectification circuitry and the near field RF communications antenna.

The rectification circuitry may comprise: a rectifying element connected in a shunt configuration to an input connection for connecting a near field RF communications antenna thereby to provide a one way conduction path between the connection and a reference voltage connection, and wherein the first inductor is connected between the input connection and an output of the rectifier for providing DC electrical energy based on the first alternating RF voltage.

The first inductor and the second inductor may comprise tracks of conductive material carried on a dielectric substrate, for example the tracks may be coils such as spiral coils. It will be appreciated in the context of the present disclosure that printed coil inductors may be used for this purpose.

The first inductor and the second inductor may be disposed on opposite surfaces of a substrate, such as a layer of a dielectric substrate material. The first inductor may surround the second inductor.

The smart card may comprise: a chip assembly comprising a near field RF communications chip, and the second inductor connected to the near field RF communications chip; and a smart card blank comprising a chip seat for seating the chip assembly in the card blank, wherein the first inductor is disposed adjacent the chip seat for inductive coupling with the second inductor.

The card blank may comprise a first dielectric substrate and the chip seat may comprise a recess in the first dielectric substrate. The chip assembly may comprise a second dielectric substrate configured to fit into the recess.

The smart cards and other apparatus described herein may comprise a first switching element connected between the first inductor and a DC output of the rectification circuitry. The near field RF communicator may be arranged to control the first switching element. This can enable the near field RF communicator chip to switch off the rectification circuit and divert all the received power to the second inductor.

A second switching element may also be provided, and connected between the second inductor and a signal input of the near field RF communicator. The near field RF communicator may also be arranged to control the second switching element. By operating the second switching element, the second inductor can be switched off so that all the received power is diverted to a DC load connected to the output of the rectifier.

Either or both of the switching elements may also be arranged to be controlled by other circuitry carried on the smart card for example—a user operable switch or a processor.

In an aspect there is provided a power splitter for a smart card comprising:
  an input connection for connecting to an inductive coupler for coupling inductively with a radio frequency, RF, H-field to provide a first alternating RF voltage at the connection; and
  a rectifier comprising:
    a rectifying element connected in a shunt configuration to the input connection thereby to provide a one-way conduction path between the connection and a reference voltage, and
    a first inductor connected between the input connection and an output of the rectifier for providing DC electrical energy based on the first alternating RF voltage;
  a second inductor, arranged for inductive coupling with the first inductor thereby to provide a second alternating RF voltage across the second inductor for connection to a near field RF communicator to enable said near field RF communicator to perform near field RF communications via the inductive coupler.

The first inductor may be connected to the input connection via a capacitor.

This apparatus may be disposed on a substrate for integration into a smartcard. The first inductor and the second inductor may comprise laminar structures, for example they may be implemented by tracks of conductive material carried on such a substrate. For example they may comprise printed coil inductors.

The substrate may comprise a sheet-like dielectric. The two inductors may be disposed adjacent each other on the same surface of this dielectric. Alternatively, the sheet-like dielectric may be interposed between the first inductor and the second inductor. For example, the two inductors may be disposed on opposite surfaces of the dielectric. The region of the dielectric occupied by the first inductor may at least partially overlap with that occupied by the second inductor. For example they may be provided on opposite surfaces of the same region of the substrate. The extent of overlap, and the distance between coils (which may be fixed by the thickness of the substrate), may determine the coupling factor (and by implication the mutual inductance) of the two inductors. It will be appreciated in the context of the present disclosure that the coupling factor, K, may be related to the mutual inductance, M, by the equation $M=K*((L1L2)^{\wedge}(0.5))$, where L1 is the inductance of the first inductor, and L2 is the inductance of the second inductor.

The splitter may comprise a capacitor connected between the output of the rectifier and the reference voltage. For example, a first plate of the capacitor may be connected to the output of the rectifier and connected to the input connection by the first inductor.

The reference voltage may comprise a ground, such as a virtual ground. For example the splitter may be single ended. The reference voltage may comprise a second connection to the inductive coupler, for example the splitter may be differential—e.g. the rectifying element may be connected in shunt across a differential connection to the inductive coupler.

The inductive coupler may be included but is optional, and the apparatus may merely have input connection(s) to allow it to be connected to such an inductive coupler thereby to obtain the alternating RF signal. In other words—the inductive coupler and the splitter may be made and sold separately. The splitter may itself further comprise the inductive coupler.

A process of manufacturing smart cards may comprise manufacturing card blanks which comprise the body of the smart card, and the inductive coupler (e.g. a near field RF communications antenna), and a chip assembly seat for seating a near field RF communications chip assembly in the card blank. The inductive coupler, and the substrate carrying the components of the splitter, other than the second inductor, may be integrated into a smart card blank. The first inductor may be disposed adjacent to the chip seat. For example it may comprise a conductive coil, such as a printed coil inductor, which surrounds the chip seat for inductive coupling with a second inductor disposed in a chip assembly and connected to a near field RF communications chip in the chip assembly. It will thus be appreciated that the splitter of the present disclosure may be provided in separate modular units such as a card blank with chip seat, and a chip assembly as described above.

Accordingly in an aspect there is provided a smart card blank comprising:
- an inductive coupler for coupling inductively with a radio frequency, RF, H-field to provide a first alternating RF voltage; and
- a rectifier comprising:
  - a rectifying element connected in a shunt configuration to the inductive coupler thereby to provide a one-way conduction path between a connection to the inductive coupler and a reference voltage connection, and
  - a first inductor connected between the connection and an output of the rectifier for providing DC electrical energy based on the first alternating RF voltage;
- wherein the card blank further comprises a chip seat, for seating a chip assembly in the card blank, and the first inductor is disposed adjacent the chip seat for inductive coupling with a second inductor carried by a chip assembly thereby to provide a second alternating RF voltage across the second inductor for connection to a near field RF communications chip in said chip assembly.

Such a smart card blank may comprise an auxiliary circuit arranged to be powered by the DC electrical energy from the rectifier. The auxiliary circuit may comprise a user interface for obtaining data from a user, examples of such an interface include a biometric sensor, e.g. a camera or fingerprint sensor and/or a data input interface such as a keypad. The auxiliary circuit may comprise a processor configured to perform data processing such as biometric authentication, and other authentication functions such as the generation of authentication one time keys.

The disclosure also provides a system comprising said card blank and said chip assembly. The chip assembly may be seated in the chip seat. Typically a card blank comprises a first dielectric substrate, which may be flat and laminar. The chip seat may comprise a recess in the first dielectric substrate. The first inductor may be arranged on the first dielectric substrate for inductive coupling with a second inductor carried by the chip assembly, for example the region of the first dielectric occupied by the first inductor may overlap with the chip seat. For example it may surround and/or underlie the chip seat. The first inductor may be provided by a coiled track of conductive material, for example a spiral. The chip assembly may comprise a micro connector—e.g. having contact pads. The micro-connector may be bonded to the near field RF communicator chip, and the contact pads may be electrically connected to corresponding contact pads of the chip. The chip and the connections between its contact pads and those of the micro-connector may be encapsulated—e.g. in a dielectric such as a polymer or curable resin frame. For example it may be potted. This dielectric may then be disposed into the chip seat in the card blank.

A completed smart card may comprise a plurality of layers, such as an outer sheet where the front side of the card artwork is printed, an outer sheet where the back side of the card artwork is printed, and perhaps also transparent overlay foils, to protect the printed sheets from scratching and abrasion, to give glossy finishing etc. Between these outer layers is the card blank, which may comprise a plastic core sheet or body, and a sheetlike dielectric substrate carrying, for example, an antenna and/or the splitters and/or rectification circuitry and/or auxiliary circuitry described herein. They may also comprise electrical connections for connection of such circuitry components to the chip and/or the chip assembly e.g. to the micro-connector. One or more of these different elements may be provided on different dielectric substrates, or on the same dielectric substrate.

The most common materials for a card body (or blank) into which the chip assembly is to be seated are PVC, PC, ABS and PET, but other materials may also be used. The sheetlike dielectric may be provided by this body, or may be provided separately and adhered, bonded, or integrated with it. The chip seat may be provided by a recess, such as a hole or cut-out, in the card body and/or the sheetlike dielectric. Other types of smart card are also contemplated and may comprise fewer layers and component parts.

Embodiments of the disclosure may comprise conductive electrical components provided on such a sheetlike dielectric substrates, such as laminar polymeric structures—for example polyamide sheets. These may be flexible. They may be less than 200 micron thick. They carry circuitry components for integration into said smart cards, such as electrical connections, transmission lines, and components of splitters and rectification circuitry described herein.

An aspect of the disclosure comprises a smart card comprising such a system. The system may not comprise a near field RF communications antenna—the antenna may be provided separately. Other aspects and examples of the present disclosure are set out in the appended claims

BRIEF DESCRIPTION OF DRAWINGS

Embodiments of the disclosure will now be described in detail with reference to the accompanying drawings, in which.

In the drawings like reference numerals are used to indicate like elements.

SPECIFIC DESCRIPTION

Figure 1:
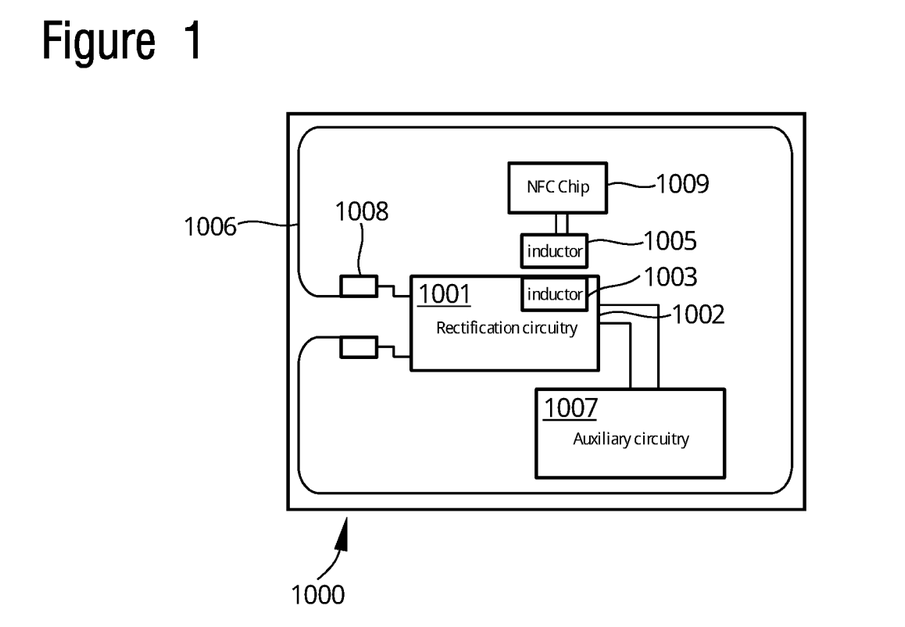
FIG. 1 shows a smart card apparatus comprising a near field RF communicator.

FIG. 1 illustrates a smart card 1000 comprising a system 1001, 1003, 1005 according to the present disclosure and a near field RF communications antenna 1006. The system 1001, 1003, 1005 is provided on a dielectric substrate (not separately illustrated in FIG. 1) which is integrated into the smart card 1000.

The system comprises rectification circuitry 1001, comprising a first inductor 1003. The system also comprises a second inductor 1005. In addition to the system 1001, 1003, 1005, the smart card 1000 also carries auxiliary circuitry 1007, and an NFC chip 1009.

The rectification circuitry 1001 is connected to the near field RF communications antenna 1006 for receiving an alternating electrical signal and converting it into DC electrical energy. A DC output of the rectification circuitry 1001 is provided at an output 1002 of the rectification circuitry. The output 1002 is connected to the auxiliary circuitry 1007.

The first inductor 1003 is arranged in the rectification circuitry so that the alternating electrical signal flows through the first inductor 1003 in the process of converting it into DC electrical energy. The first inductor 1003 and the second inductor 1005 are disposed in proximity to each other on the smart card to enable inductive coupling between the first inductor 1003 and the second inductor 1005.

The second inductor 1005 is connected to the NFC chip for providing an alternating electrical signal, received via inductive coupling with the first inductor, to a signal input of the NFC chip 1009. The first inductor 1003 and the second inductor 1005 may each comprise coiled laminar tracks of conductive material also known as printed coil inductors. The use of a printed coil inductor in this context may assist in the provision of a low profile system adapted for being fully encapsulated within a smart card.

In operation, the near field RF communications antenna couples inductively with an RF H-field received from another near field RF communicator (such as an NFC reader) in near field range. This provides an alternating electrical signal to the rectification circuitry. The rectification circuitry converts the alternating electrical signal to DC electrical energy, and the process of doing so causes an alternating electrical current to flow in the first inductor 1003. The second inductor 1005 is coupled inductively with the first inductor 1003, and so the alternating electrical current in the first inductor 1003 gives rise to a corresponding alternating electrical current in the second inductor 1005. The second inductor provides this signal to the NFC chip 1009 to enable the NFC chip to perform near field RF communications operations via the antenna 1006.

These and other embodiments of the present disclosure enable received power to be efficiently divided in a smart card between an auxiliary circuit, and an NFC chip. The two inductors 1003, 1005 form a coupled pair, and by adjusting the area of overlap and/or the relative sizes and geometries of the inductors, the coupling factor (and so the split of power between the chip and the auxiliary circuit) can be controlled. The NFC chip 1009 may comprise a secure element (such as that integrated into bank cards and credit cards), or any near field RF communicator such as an RFID chip.

Amongst other advantages, embodiments of the disclosure enable power splitting circuits to be provided in smart cards but using fewer inductors, and a simpler circuit than has been the case in prior art implementations. It may also provide advantages in terms of smart card manufacturing processes, because it may enable a secure element or other near field chip to be dropped into a laminated stack as a physically separate inlay.

The smart card 1000 may have dimensions of a credit card such as that defined in ISO/IEC 7810 standard, for example it may be about 85 mm by about 55 mm (for example 85.60 by 53.98 millimetres). As an alternative, it may have an ID-000 form factor, e.g. about 25 mm by 15 mm (0.98 in x 0.59 in) commonly used in SIM cards. The majority of the external surface area of the smart card may be embossed with identifying markings such as the name of the owner and account codes. Other identifiers, such as holograms, may be inlaid onto its surface. The smart card 1000 may comprise a body of a dielectric substance such as plastic, e.g. polyvinyl chloride, or a polyethylene-terephthalate-based polyester. The body of the smart card may encapsulate the antenna 1006, and the system 1001, 1003, 1005. The smart card may have a total thickness of less than 3 mm, for example less than 2 mm, for example about 0.76 millimetres (0.030 in) thick. The system 1001, 1003, 1005 may be confined to an area of the smart card the outer surfaces of which are free from embossed marking and/or inlaid features such as holograms. As such, space may be at a premium and there may be a significant need for miniaturisation.

As described above, the circuitry components which make up the system 1001, 1003, 1005 and/or the auxiliary circuitry 1007 may be carried on a dielectric substrate. This dielectric substrate may be sheetlike (e.g. a flexible laminar structure) sandwiched between two insulating layers which encapsulate it and provide structural support to the sheetlike dielectric to make up the smartcard. These two insulating layers may comprise paper and/or plastics such as polyvinyl chloride, polyethylene-terephthalate-based polyesters, acrylonitrile butadiene styrene or polycarbonate. The sheetlike dielectric comprises a first region in which a ground plane conductor is provided in the form of a layer of conductive material, separated from the circuitry components by a layer of the dielectric. The embodiments described in the remainder of this application may be implemented in smart card systems such as that described with reference to FIG. 1.

Figure 2:
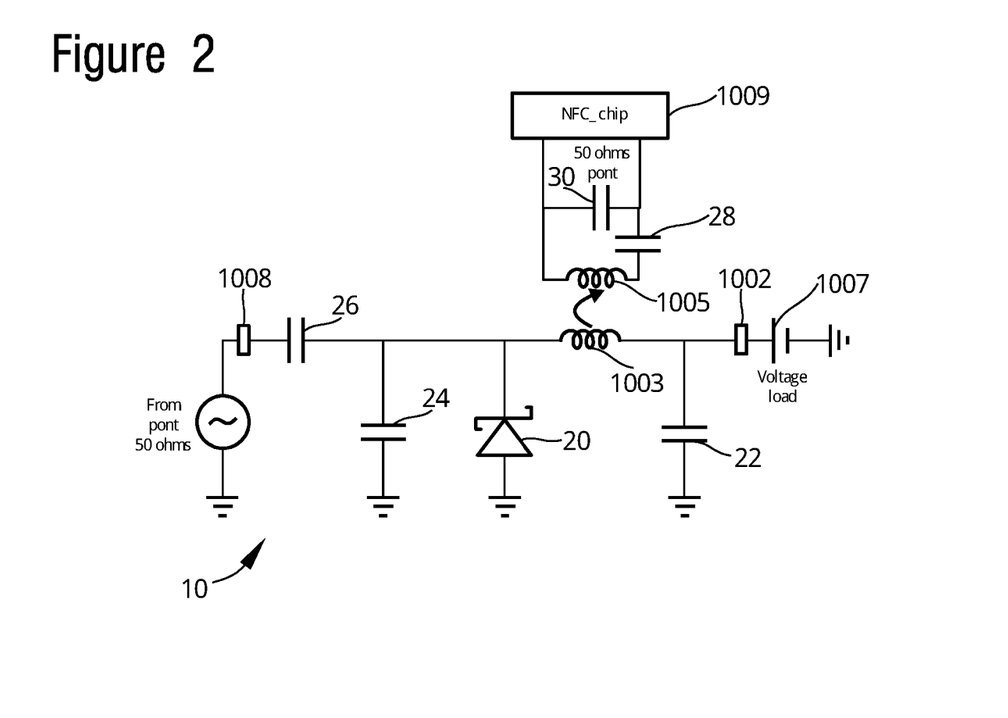
FIG. 2 shows a diagram of circuitry for use in an apparatus such as that illustrated in FIG. 1.

FIG. 2 shows an example of circuitry 10 which can be used in a smart card 1000 such as that described with reference to FIG. 1.

The circuitry 10 comprises a rectification element 20, a first inductor 1003, a first capacitor 22 and an output connection 1002 for connection to a voltage load—such as auxiliary circuitry 1007.

The apparatus shown in FIG. 1 also comprises a source of AC electrical signal, such as an input connection 1008 connected to a near field communications antenna, such as the antenna 1006 illustrated in FIG. 1. It also comprises a second capacitor 24, and a third capacitor 26.

Also illustrated in FIG. 2 is an NFC chip 1009, a second inductor 1005, a fourth capacitor 28, and a fifth capacitor 30. The fifth capacitor 30 is connected across a signal input of the NFC chip 1009. A first plate of the fifth capacitor 30 is connected to a first plate of the fourth capacitor 28. A second plate of the fourth capacitor 28 is connected to the second plate of the fifth capacitor 30 by the second inductor 1005.

The second inductor 1005 is positioned for inductive coupling with the first inductor 1003.

A first plate of the first capacitor 22 is connected to the output connection 1002 and to the first inductor 1003. A second plate of the first capacitor 22 is connected to a reference voltage such as ground, for example a virtual ground. The first inductor 1003 connects the first plate of the first capacitor 22 to the output of the rectification element 20, and to the second capacitor 24 and to the third capacitor 26. The third capacitor 26 is connected in series between the input connection 1008 and the first inductor 1003. It will thus be appreciated that the first inductor 1003 is connected in series between the third capacitor 26 and the output connection 1002. A first plate of the second capacitor 24 is connected by the third capacitor 26 to the input connection 1008. The second plate of the second capacitor 24 is connected to the reference voltage.

The rectification element 20 comprises a one way conduction path, such as may be provided by a diode, and is connected in parallel with the second capacitor 24.

It can thus be seen that the rectification element 20, the first inductor 1003, and the second capacitor 24, and the third capacitor 26 are arranged to provide a rectifier, for converting AC electrical signals received from the input 1008 into DC electrical energy at the output 1002. The first capacitor 22 may assist in reducing output ripple from the rectifier. This circuitry may be used to power auxiliary circuitry 1007 which may be carried by a smart card.

It will be appreciated in the context of the present disclosure that the first inductor 1003 plays a number of roles:
(i) it helps the RF input matching because the inductance of the antenna is typically quite high;
(ii) it reduces the rectifier output impedance;
(iii) it attenuates the ripple in current output from the rectifier.

The first inductor 1003 typically has a fairly low impedance, for example less than 10 µH, for example less than 5 µH, for example about 2.7 µH which may provide an impedance of 230 ohms at 13.56 MHz. The alternating electrical signal is naturally split between rectification element 20 and the first inductor 1003. The split may depend on the level of RF input power.

For example, for high RF input power, the rectification element (e.g. a diode) may turn on more often during each RF cycle. This provides an effective reduction in the impedance of the one way conduction path provided by the rectification element 20. This increases the power delivered to the diode and hence the level of DC electrical energy provided by the rectifier.

At low RF power levels, the rectification element 20 (e.g. a diode) may be predominantly off. This increases the effective impedance of this branch of the circuit, and as a result most of the signal goes to the inductor 1003. This can enable the NFC chip to continue to work even where there is not sufficient power to operate the auxiliary circuits.

It is explained above that certain of the capacitors 22, 24, 26 play particular roles in the circuit. For example, the second and third capacitors 24, 26 may play a role in impedance matching. However, depending on their capacitances, the role of each component may change. For example if the third capacitor 26 has a high capacitance and the first capacitor 22 has a lower capacitance, the first capacitor 22 may play a greater role in matching, and the third capacitor 26 may play a greater role in ripple suppression. Therefore, in such circumstances the first capacitor 22 may be considered part of the rectification circuit.

Figure 3:
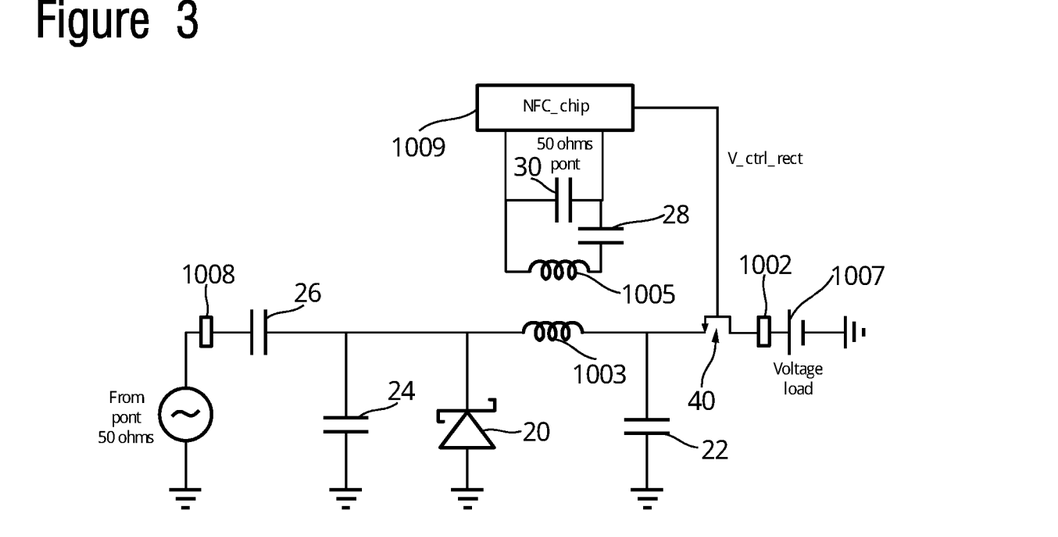
FIG. 3 shows another example of circuitry such as that illustrated in FIG. 2.

FIG. 3 shows another example of circuitry for integration into the smart card system shown in FIG. 1. This circuitry is identical to that described with reference to FIG. 2, other than in that a first voltage controlled impedance, VCI, 40 is connected to provide a controllable electrical conduction path between the first plate of the first capacitor 22 and the output connection 1002. A control connection of the VCI 40 is connected to a control output of the NFC chip 1009.

The VCI 40 is configured to vary the impedance of the conduction path through the VCI based on the signal applied to its control connection by the NFC chip 1009. This VCI may be provided by a transistor, such as a field effect transistor, which can be operated as a switch. Any appropriate switching element may be used to provide this function.

By operating the VCI, the NFC chip 1009 may thus switch on or off the connection to the auxiliary circuit 1007. Basically, when the conduction path through the VCI is switched ON, the rectification circuit can power the auxiliary circuit, as long as the incoming RF power is sufficient. When the conduction path through the VCI is switched OFF, the capacitors 22, 24 cannot discharge, which disables activation of the diodes, and all of the RF signal is directed to the chip 1009.

As an alternative, the control connection of the VCI 40 may be connected to a control output of the auxiliary circuitry 1007, and the auxiliary circuitry may be configured to operate the VCI 40 to control the division of the RF signal between the chip 1009 and the auxiliary circuit 1007.

Figure 4:
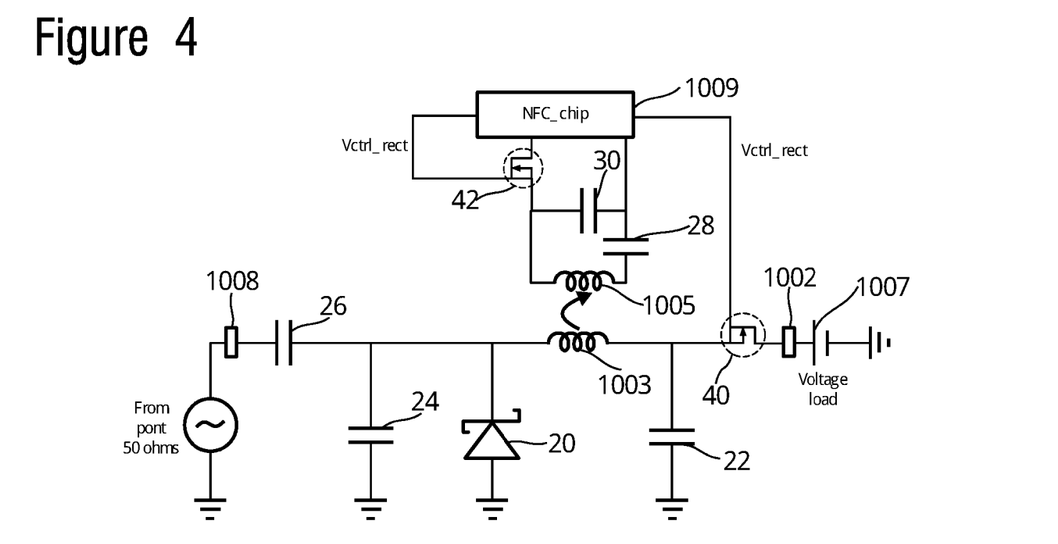
FIG. 4 shows another example of circuitry such as that illustrated in FIG. 3.

FIG. 4 shows another example of circuitry for integration into the smart card system shown in FIG. 1. This circuitry is identical to that described with reference to FIG. 3, other than in that a second voltage controlled impedance, VCI, 42 is connected to provide a controllable electrical conduction path between the second inductor 1005 and the signal input of the NFC chip 1009.

A control connection of the VCI 42 is connected to a control output of the NFC chip 1009.

The VCI 42 is configured to vary the impedance of the conduction path through the VCI based on the signal applied to its control connection by the NFC chip 1009. This VCI may be provided by a transistor, such as a field effect transistor, which can be operated as a switch. Any appropriate switching element may be used to provide this function. It will be appreciated in the context of the present disclosure that although any switching element can be used, the second VCI 42 may be selected to provide isolation for RF signals (such as those used in near field RF communications technologies). Any high isolation switch may be used. One example is an nFET Triple-well (TW) transistor.

By operating the second VCI 42, the NFC chip 1009 may thus switch on or off the second inductor 1005. When this is switched off, the rectifier 20, 1003, 26, can divert all received power to the auxiliary circuit 1007.

As a further alternative, the control connection of the VCI 42 may be connected to a control output of the auxiliary circuitry 1007, and the auxiliary circuitry may be configured to operate the VCI 42 to control the provision of the RF signal to the chip 1009.

Figure 5:
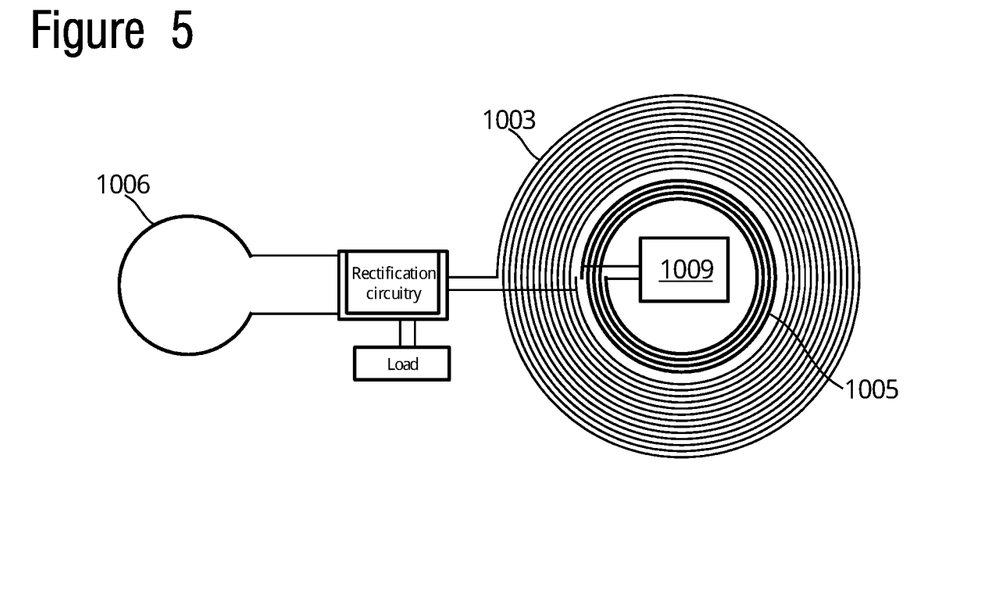
FIG. 5 shows a first illustration of an arrangement of inductors usable in a system such as any of those described with reference to FIGS. 1 to 4.

FIG. 5 shows a possible arrangement for the first inductor 1003 and the second inductor 1005. As illustrated in FIG. 5, the first inductor 1003 and the second inductor 1005 may both comprise a circular spiral of conductive tracks, and each spiral may have a plurality of turns. The first inductor 1003 may surround the second inductor 1005. The two inductors 1003, 1005 may have a different number of turns from each other.

Figure 6:
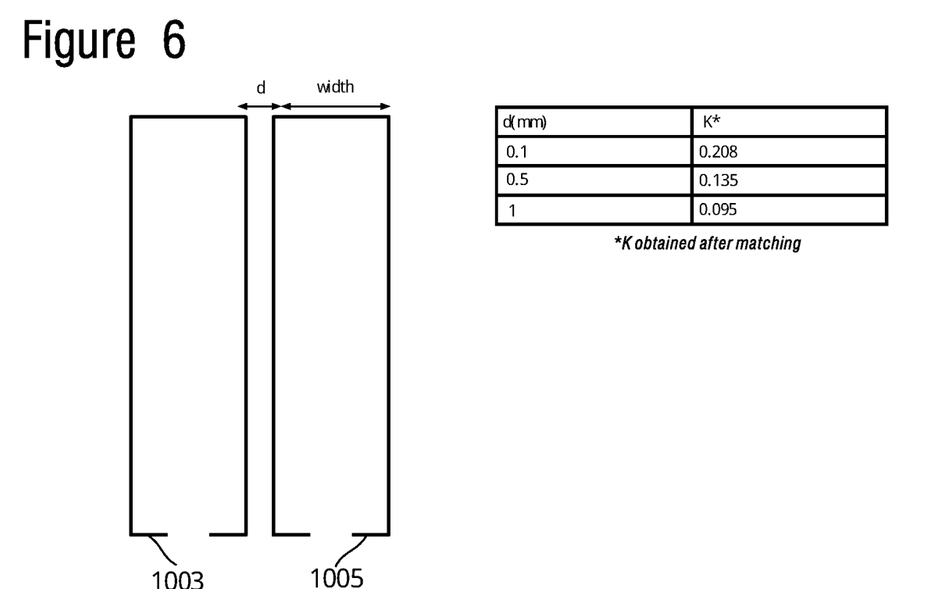
FIG. 6 shows a second illustration of such an arrangement of inductors.

FIG. 6 shows a second possible arrangement, in which both inductors are provided in the same layer—e.g. on the same surface of the same substrate. The inductors may comprise single turn loops of conductive track. The loop may be rectangular, and positioned on the substrates so that the ends of the rectangles are aligned, whilst the closest adjacent sides of the rectangular loops are spaced apart on the surface of the substrate. The spacing between the loops may be about 1%, for example 5%, for example 10% of their width. For example the inductors may be 10 mm wide, and the spacing between them may be 0.1 mm, 1 mm, or 10 mm.

It has been found that the coupling factor K between such coils is 0.21 at 0.1 mm spacing, 0.14 at 0.5 mm spacing, and 0.10 at 1 mm spacing.

Figure 7:
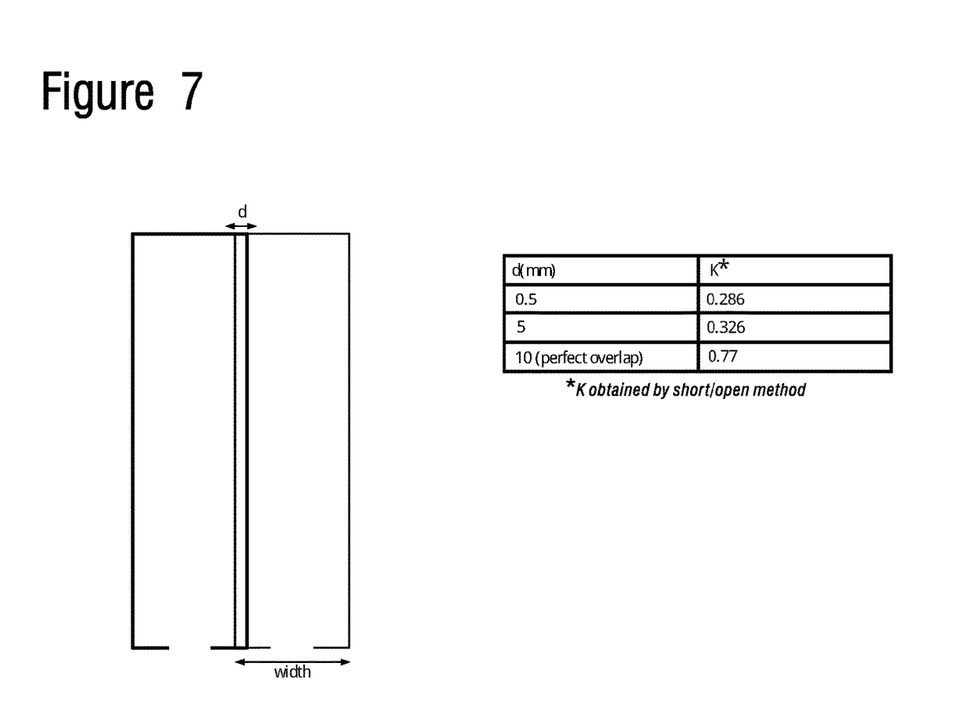
FIG. 7 shows a third illustration of such an arrangement of inductors.

FIG. 7 shows a further possible arrangement, in which both inductors are provided in a different layer—e.g. on the different surfaces of the same substrate. The inductors 1003, 1005 illustrated in FIG. 7 comprise rectangular loops as described above with reference to FIG. 6, however because they are in different layers they are able to overlap. The two loops may overlap by at least 5%, for example at least 50%, for example 100%—e.g. the boundary of the two loops may follow the same path on the two opposite surfaces of the substrate so that one perfectly underlies the other. In FIG. 7 the ends of the rectangles are aligned, whilst the sides of the rectangular loops overlap on opposite surfaces of the substrate. The example shown in FIG. 7 comprises loops which are 30 mm long and 10 mm wide and which overlap by a distance d=0.5 mm (5% overlap) at this overlap the coupling factor K has been found to be about K=0.29. Other configurations have also been considered and an overlap by a distance of 5 mm (50% overlap) has been found to provide a coupling factor of about K=0.33. An overlap by a distance of 10 mm (100% overlap) has been found to provide a coupling factor of about K=0.77.

Figure 8:
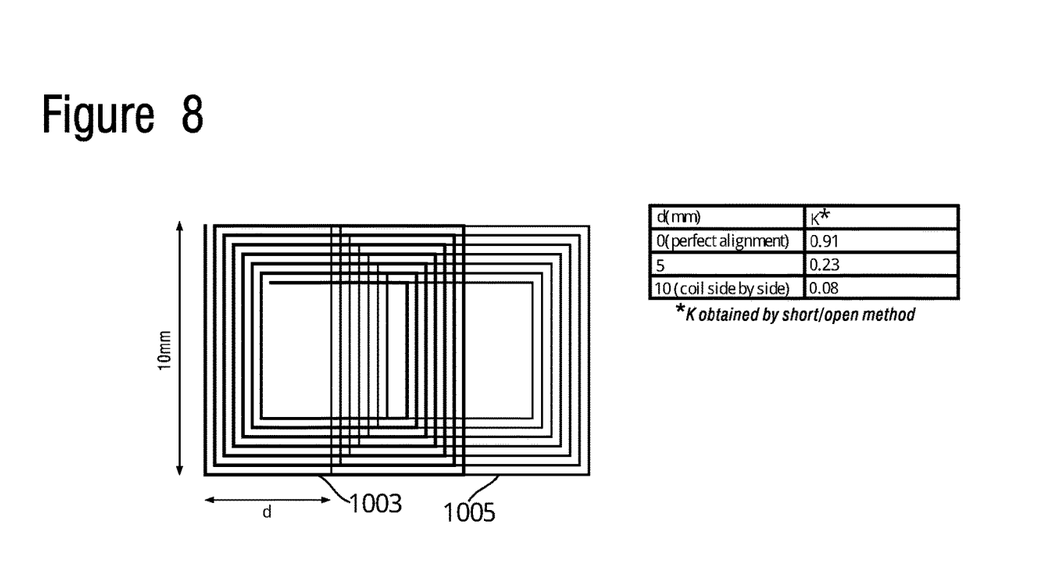
FIG. 8 shows a fourth illustration of such an arrangement of inductors.

FIG. 8 shows a further possible arrangement, in which both inductors are provided in a different layer—e.g. on the different surfaces of the same substrate. In the arrangements such as that illustrated in FIG. 8, the first inductor 1003 and the second inductor 1005 each comprise tracks of conductive material arranged in a rectangular spiral, e.g. a square spiral. In the particular arrangement shown the inductors 1003, 1005 are square spirals in which two opposite edges of the first inductor 1003 are aligned with two opposite edges of the second inductor 1005. The degree to which the two inductors overlap can therefore be defined with reference to the distance, d, between the left hand edge of the first inductor 1003 (which is on the left hand side in the view shown in FIG. 8) and the left hand edge of the second inductor (which is on the right hand side in the view shown in FIG. 8). The example shown in FIG. 8 comprises a first inductor and a second inductor which are both identical. They may both be square spirals, which may both be 10 mm square each having 7 turns, each inductor having an inductance of 688 nH and being disposed on opposite sides of a dielectric substrate layer of 0.1 mm thickness. These two coils may overlap by a distance d=0 (100% overlap, coils aligned but on different planes) at this overlap the coupling factor K has been found to be about K=0.91. By reducing the degree of overlap, the coupling factor between the two inductors can be reduced—for example the coil arrangement illustrated in FIG. 8 has been found to provide K-0.23 at 50% overlap (e.g. d=5 mm). It will be appreciated that these inductor coils need not be square—for example other rectangular shapes may be used. In addition round (e.g. circular) spirals may also be used.

Figure 9:
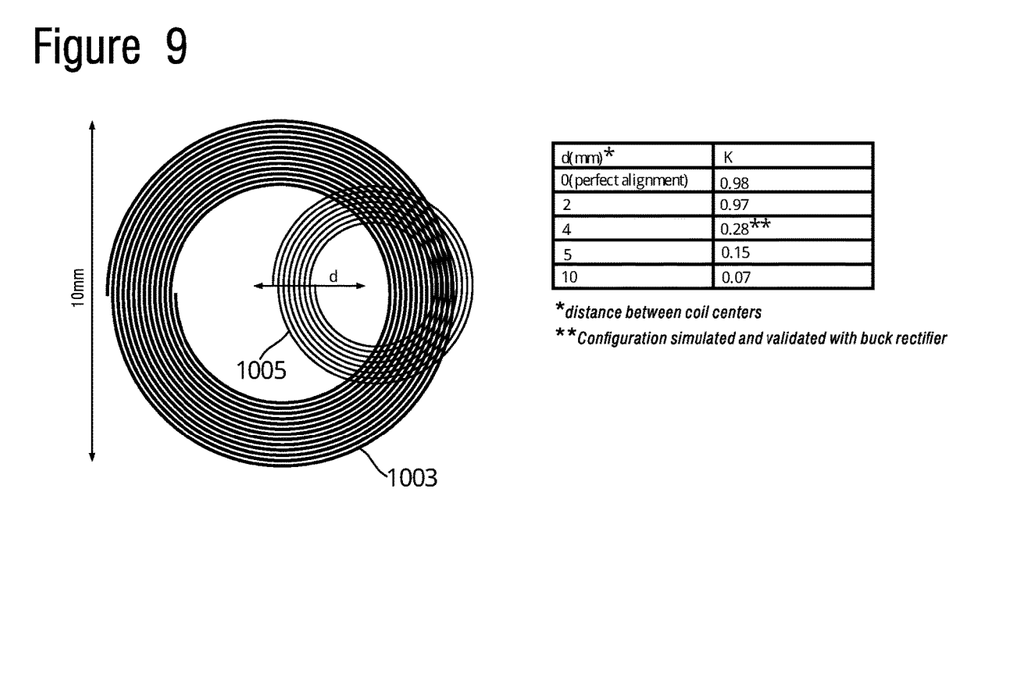
FIG. 9 shows a fifth illustration of such an arrangement of inductors.

FIG. 9 shows a further possible arrangement, in which again both inductors are provided in a different layer—e.g. on the different surfaces of the same substrate. In arrangements such as that illustrated in FIG. 8 the first inductor 1003 and the second inductor 1005 are both circular spiral coils. They may be disposed on opposite sides of a dielectric substrate layer of 0.1 mm thickness. The first inductor 1003 may have 14 turns, and an outer diameter of 13.5 mm, and an inductance L=2.77 uH. The second inductor may have 9 turns and an outer diameter of 8 mm. If the centers of these two coils are aligned (100% overlap) the coupling factor K has been found to be about K=0.98.

Figure 10:
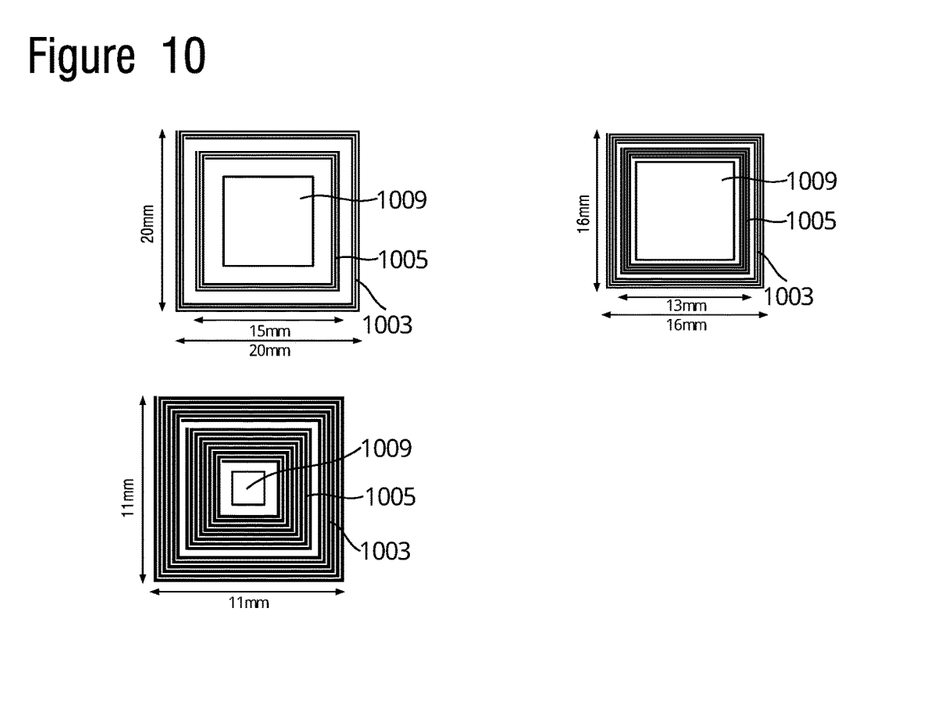
FIG. 10 shows three possible arrangements of inductors surrounding a near field RF communications chip.

FIG. 10 shows a series of possible arrangements of the inductors 1003, 1005 arranged to surround a near field RF communications chip. The two inductors 1003, 1005 may be provided in the same layer—e.g. on the same surface of the substrate. The outer coil (e.g. first inductor 1003) may be carried by a smart card blank, and the inner coil (e.g. the second inductor 1005) may be carried on a chip assembly for insertion into a chip seat in the smart card blank. As shown the second inductor may surround the near field RF communicator chip, and the first inductor 1003 may surround the second inductor 1005. The first inductor and the second inductor may have a different number of turns. They may both be square spirals, and may be aligned with each other—e.g. the centres of the two coils may coincide.

The coil centres need not be aligned—assuming there's enough space, the inner coil can be offset with respect to the outer one. It may however be beneficial for the inner coil to be completely surrounded by the outer coil.

The antennas described herein typically comprise an electrical conductor such as a conductive track or wire arranged for coupling inductively with an alternating H-field to provide an alternating electrical signal. Typically, such an antenna comprises a loop having one or more turns. It will be appreciated in the context of the present disclosures that an NFC antenna may have a large inductance, perhaps of 1 µH or more. Such antennas may be adapted for coupling with signals in a near field RF frequency band, which generally comprises 13.56 MHz. It will be appreciated in the context of the present disclosure that such signal may have a wavelength of approximately 22 m.

The near field RF communicator chip of the apparatus described herein comprises an integrated circuit, which may be implemented as a single semiconductor die. This chip may comprise a front end, for connection to the antenna. The front end may include things such as a voltage regulator, a dedicated rectifier for the near field RF communicator, or other circuitry for connecting the near field RF communicator to the antenna. The chip also comprises a controller for performing simple data operations such as modulating and demodulating data from signals received via the antenna.

The rectification circuitry comprises a rectifying element, such as a diode, for example a Schottky diode, arranged to convert the alternating electrical signal received from the splitter into a direct current, DC, electrical signal. This DC electrical signal may be used to power an auxiliary circuit, such as a biometric processing device. The rectifier may also comprise components for matching the input and/or output impedance of the rectifier to the circuits to which it is connected. The rectifying element may be provided by appropriately arranged voltage controlled impedances, such as transistors. For example a diode connected transistor may be used—examples of diode connected transistors may be provided by:

connecting the base and collector of a BJT;
connecting the drain and source of a JFET; or
connecting the gate and drain of a MOSFET.

Other ways of providing a one way conduction path through a rectifying element may be used. It will also be appreciated that the rectifying element may itself comprise a plurality of such components, which may be arranged in parallel.

It will be appreciated in the context of the present disclosure that the circuitry components described herein may comprise lumped components such as discrete capacitors and inductors, as distinct from distributed elements such as microstrips or transmission lines which provide spatially distributed capacitance and/or inductance along their length.

A printed coil inductor may comprise a laminar conductive coil on one surface of a dielectric, which follows a spiral path in from an input connection at the outside of the spiral to a connection through the dielectric inside the spiral. On the other side of the dielectric, a second laminar conductive coil may follow a mirror image of the same path out from this connection to an output connection at the outward edge of the spiral. The output connection may also be connected back through the dielectric so that input and output to the inductor may be provided on the same surface of the dielectric. The dielectric may comprise a substrate upon which a circuit is printed in the manner of a PCB. Other types of printed coil inductors may be used.

A printed coil inductor may comprise a conductive wire with an insulating coating placed on a surface of a dielectric, which follows a spiral path on just one side of the dielectric.

Embodiments of the present disclosure may provide circuit assemblies for integration into smart cards which are less than 0.5 mm thick (of which 0.1 mm may be accounted for by the substrate copper, and 0.35 mm by other circuitry components). Such assemblies may then be integrated into a smart card by being sandwiched between other layers such as a plastic front and back of the card.

The sheetlike dielectric substrate described herein may be provided by any laminar dielectric, and may be flexible. One example is a polyamide sheet, but other substrates may be used.

It will be appreciated from the discussion above that the embodiments shown in the Figures are merely exemplary, and include features which may be generalised, removed or replaced as described herein and as set out in the claims. With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

In some examples the IC described herein may comprise a controller, such as a microprocessor, configured to perform a method such as biometric authentication using power supplied from a near field RF communications antenna via a rectifier as described herein. In some examples the controller may comprise digital logic, such as field programmable gate arrays, FPGA, application specific integrated circuits, ASIC, a digital signal processor, DSP, or by any other appropriate hardware. In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein. The controller may comprise an analogue control circuit which provides at least a part of this control functionality. An embodiment provides an analogue control circuit configured to perform any one or more of the methods described herein.

It will be appreciated in the context of the present disclosure that the apparatus described herein may be provided on multi-layered substrates. Accordingly, when an article is described as being "on the surface of a substrate" this may refer to the surface of a particular layer in a multi-layered dielectric. For example further dielectric layers may be provided on top of a component which is disposed on a surface of a dielectric substrate—it need not be an "external surface" of the substrate.

The above embodiments are to be understood as illustrative examples. Further embodiments are envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A smart card comprising:
   a near field RF communications antenna, for inductive coupling with an H-field produced by another near field RF communications device to provide an alternating electrical signal to an output of the antenna;
   rectification circuitry connected to the output of the antenna to receive the alternating electrical signal from the near field RF communications antenna of the smart card, and convert it into DC electrical energy at an output of the rectification circuitry for powering an auxiliary circuit, wherein the rectification circuitry comprises a first inductor connected between the output of the antenna and the output of the rectification circuitry so that the alternating electrical signal flows through the first inductor, wherein the rectification circuitry further comprises:
   a rectifying element connected in a shunt configuration to an input connection for connecting a near field RF communications antenna thereby to provide a one way conduction path between the connection and a reference voltage connection; and
   a second inductor arranged for inductive coupling with the first inductor to provide the alternating electrical signal to a near field RF communicator.

2. The smart card of claim 1 wherein the first inductor is arranged to provide impedance matching between the rectification circuitry and the near field RF communications antenna.

3. The smart card of claim 1 wherein the first inductor and the second inductor comprise tracks of conductive material carried on a dielectric substrate.

4. The smart card of claim 3 wherein the first inductor and the second inductor are disposed on opposite surfaces of the substrate.

5. The smart card of claim 3 wherein the first inductor surrounds the second inductor, and the smart card comprises:
   a chip assembly comprising a near field RF communications chip, and the second inductor connected to the near field RF communications chip; and
   a smart card blank comprising a chip seat for seating the chip assembly in the card blank,
   wherein the first inductor is disposed adjacent the chip seat for inductive coupling with the second inductor.

6. The smart card of claim 1 comprising a first switching element connected between the first inductor and a DC output of the rectification circuitry.

7. The smart card of claim 6, wherein at least one of
   (i) the near field RF communicator; and (ii) auxiliary circuitry carried by the smart card;
is arranged to control the first switching element.

8. The smart card of claim 1 comprising a second switching element connected between the second inductor and a signal input of the near field RF communicator.

9. The smart card of claim 8 wherein at least one of
(i) the near field RF communicator; and
(ii) auxiliary circuitry carried by the smart card;
is arranged to control the second switching element.

10. A power splitter comprising:
an input connection for connecting to an inductive coupler for coupling inductively with a radio frequency, RF, H-field to provide a first alternating RF voltage at the connection; and
a rectifier comprising:
a rectifying element connected in a shunt configuration to the input connection thereby to provide a one-way conduction path between the connection and a reference voltage connection, and
a first inductor connected between the input connection and an output of the rectifier for providing DC electrical energy based on the first alternating RF voltage;
a second inductor, arranged for inductive coupling with the first inductor thereby to provide a second alternating RF voltage across the second inductor for connection to a near field RF communicator to enable said near field RF communicator to perform near field RF communications via the inductive coupler.

11. The splitter of claim 10, wherein components of the splitter are disposed on a substrate for integration into a smart card.

12. The splitter of claim 10, wherein the first inductor and the second inductor comprise laminar structures comprising tracks of conductive material carried on the substrate.

13. The splitter of claim 10 wherein the substrate comprises a sheet-like dielectric interposed between the first inductor and the second inductor.

14. The splitter of claim 10 comprising a capacitor connected between the output of the rectifier and the reference voltage.

15. The splitter of claim 10 wherein the reference voltage connection comprises one of: (a) a connection to a virtual ground, and (b) a second connection to the inductive coupler.

16. A smart card blank comprising:
an inductive coupler for coupling inductively with a radio frequency, RF, H-field to provide a first alternating RF voltage; and
a rectifier comprising:
a rectifying element connected in a shunt configuration to the inductive coupler thereby to provide a one-way conduction path between a connection to the inductive coupler and a reference voltage connection, and
a first inductor connected between the connection and an output of the rectifier for providing DC electrical energy based on the first alternating RF voltage;
wherein the smart card blank further comprises a chip seat, for seating a chip assembly in the card blank, and the first inductor is disposed adjacent the chip seat for inductive coupling with a second inductor carried by a chip assembly thereby to provide a second alternating RF voltage across the second inductor for connection to a near field RF communications chip in said chip assembly.

17. The smart card blank of claim 16 comprising an auxiliary circuit arranged to be powered by the DC electrical energy from the rectifier.

18. The smart card blank of claim 16 wherein the first inductor comprises a coiled track of conductive material which surrounds the chip seat, and the card blank comprises a first dielectric substrate and the chip seat comprises a recess in the first dielectric substrate.

19. The smart card blank of claim 16 and a chip assembly configured to be seated in the chip seat for the manufacture of a smart card,
wherein the chip assembly comprises a near field RF communications chip and said second inductor connected to the near field RF communications chip.

20. A smart card comprising:
a near field RF communications antenna, for inductive coupling with an H-field produced by another near field RF communications device to provide an alternating RF voltage at an output of the antenna;
a near field RF communicator which communicates with the other near field RF communications device via the near field RF communications antenna;
an auxiliary circuit;
a power splitter that divides the alternating RF voltage from the antenna between the auxiliary circuit and the near field RF communicator, the power splitter comprising:
an input connection for connecting to the output of the antenna;
a rectifier comprising:
a rectifying element,
a DC output for outputting DC energy, and
an inductive output for outputting RF energy,
wherein the inductive output is provided by a first inductor connected between the input connection and the DC output of the rectifier,
wherein the rectifier provides a DC voltage for powering the auxiliary circuit at the DC output, based on the alternating RF voltage, and
wherein the rectifier provides the RF energy to the near field RF communicator at the inductive output, wherein the RF energy is based on the alternating RF voltage; and the smart card further comprising:
a second inductor connected to the near field RF communicator wherein the second inductor couples inductively with the first inductor of the rectifier to receive the RF energy and provides the RF energy to the near field RF communicator wherein the near field RF communicator performs near field RF communications with the other near field RF communications device via the RF energy.

* * * * *